July 2, 1940.  H. M. KINSLOW  2,206,571
INTERNAL COMBUSTION ENGINE
Filed July 5, 1938  2 Sheets-Sheet 1

HENRY M. KINSLOW,
INVENTOR.
BY
ATTORNEY

July 2, 1940.  H. M. KINSLOW  2,206,571
INTERNAL COMBUSTION ENGINE
Filed July 5, 1938   2 Sheets-Sheet 2
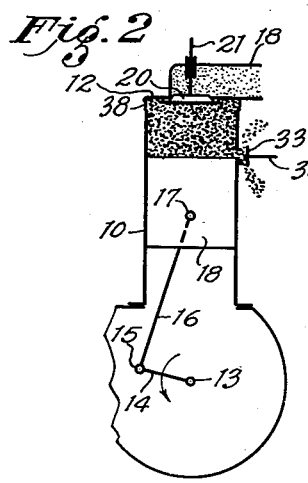
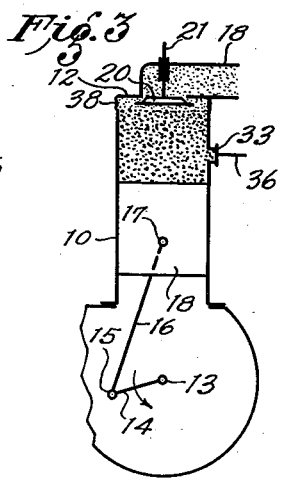
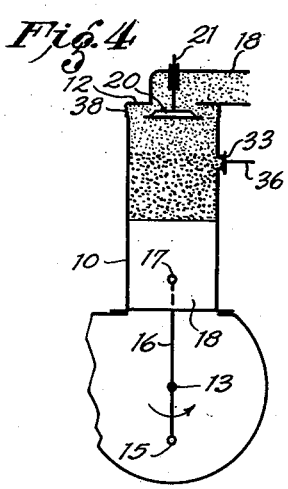
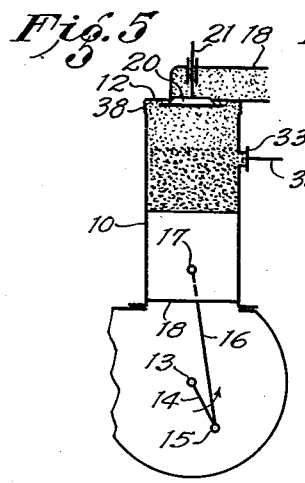
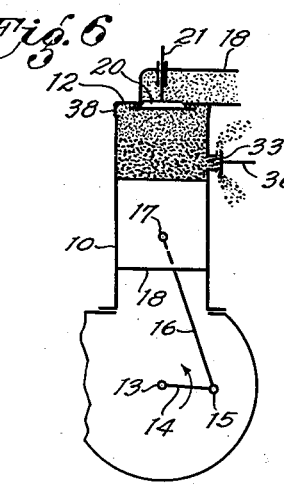
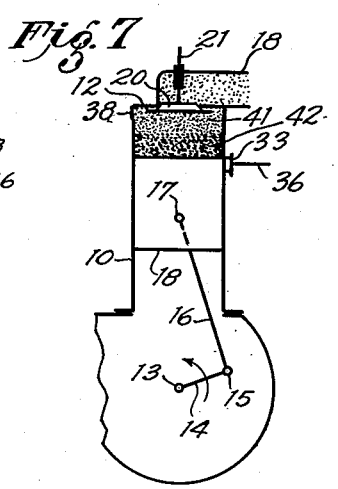
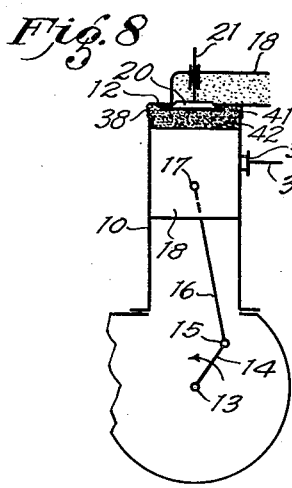
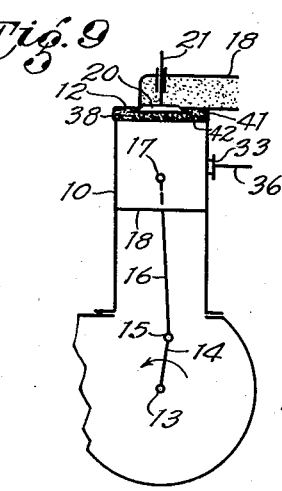
HENRY M. KINSLOW,
INVENTOR.
By James M. Abbett
ATTORNEY Patented July 2, 1940

2,206,571

UNITED STATES PATENT OFFICE 2,206,571

INTERNAL COMBUSTION ENGINE

Henry M. Kinslow, Santa Ana, Calif., assignor to Kinslow Engineering Corporation, Santa Ana, Calif., a corporation of Nevada Application July 5, 1938, Serial No. 217,470

8 Claims. (Cl. 123—65)

This invention relates to an internal combustion engine and particularly pertains to a method and means of producing an explosive force, and is a continuation in part of my co-pending application entitled "Internal combustion engine," Serial No. 172,689, filed November 4, 1937.

Heretofore internal combustion engines have been of two general types, one type utilizing a gaseous charge which is ignited by an ignition element such as a spark plug disposed within the compression space of the engine cylinder, such structures being those commonly embodied in gasoline engines used on automobiles. The other type of engine depends for the ignition of the charge upon the heat produced within an explosive charge, such engines being generally known as of the Diesel type.

In considering the spark ignition type of internal combustion engines, these engines are broadly divided into two classes, the more usual type being known as a 4-cycle engine and another type known as a 2-cycle engine. The 2-cycle engine has advantages over the 4-cycle engine in that twice as many power strokes are obtained in the same number of revolutions as compared with the number of power strokes obtained in the 4-cycle engine. This makes it possible for an engine of smaller size when constructed along 2-cycle lines to produce the same power as that obtained by much larger and more expensive 4-cycle engines. Engines of the Diesel type also have advantages in that they develop a large amount of power, may use a relatively low grade of fuel and do not require expensive or complicated ignition systems although they do require expensive fuel ignition means and must operate under high compression.

It is the principal object of the present invention to provide an internal combustion engine which embodies the desirable features of 2-cycle and 4-cycle ignition type engines and have the Diesel type engine, thereby producing an engine which is simple in construction, does not require complicated valve mechanism or timing system and which at the same time insures a maximum amount of power in an engine of minimum weight while operating on high or low grade fuels. In order to obtain these objects it has been necessary to perfect a new method of handling a charge of explosive fuel, igniting the same and controlling its intake and exhaust, whereby a new and novel method of engine combustion and control is provided as well as a new and novel engine structure. The present invention, therefore, contemplates the provision of an engine including a cylinder, a piston, a crankshaft and valve means, the parts of which are designed in proportion to embody a novel method of gaseous fuel introduction into the cylinder, a novel method of exhaust of burned gases from the cylinder, and a novel method of ignition of the fuel which contemplates a particular balance between the fresh gases and the burned gases within the cylinder and a particular kinetic and chemical action between these two types of gases within the cylinder, whereby a novel ignition and burning of the gases is established, propagated and controlled.

The invention is illustrated by way of example in the accompanying drawings, in which:

Fig. 2 is a view in diagram showing the engine and the relationship of its parts when the piston is at an intermediate point in its stroke and when a partial exhaust of the burned gases takes place and at which time the gases are under positive pressure.

Fig. 3 is a view similar to Fig. 2 showing the engine parts at another intermediate stage during the firing stroke, at which time the spent gases are under the negative pressure.

Fig. 4 is a view similar to Fig. 2 showing the piston at the end of its power stroke and disclosing the stratification of spent gas and fresh gas within the cylinder under negative pressure.

Fig. 5 is a view similar to Fig. 2 showing the piston at an initial interval of its compression stroke and while the gases within the cylinder are still under negative pressure.

Fig. 6 is a view similar to Fig. 2 showing the engine with a piston on its up-stroke after the inlet valve has been closed and sufficient positive pressure has been created within the cylinder to open the outlet valve.

Fig. 7 is a view similar to Fig. 2 showing the piston on the up-stroke after it has closed the exhaust port and continues to compress the gases which have been entrapped within the cylinder.

Fig. 8 is a view similar to Fig. 2 showing the piston as it nears the end of its compression stroke.

Fig. 9 is a view similar to Fig. 2 showing the piston within the cylinder just prior to the ignition of the fuel and before the beginning of the power stroke.

Figure 1:
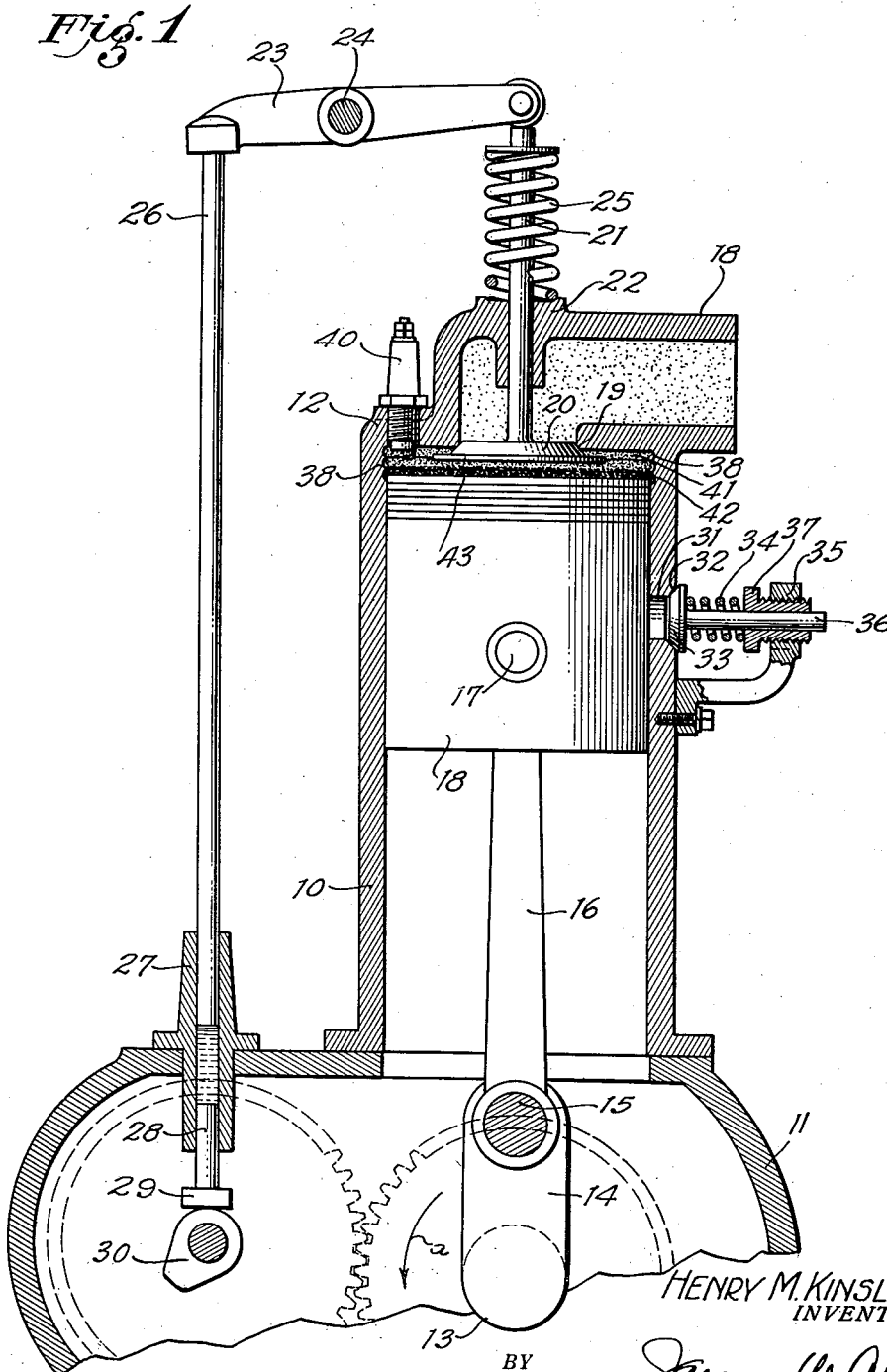
Figure 1 is a view in central vertical section through the engine of the type here disclosed and in a plane at right-angles to the axis of the crank-shaft, and with their parts in position for initial operation of the engine on the firing stroke.

Referring more particularly to the drawings, 10 indicates an engine cylinder suitably mounted upon a crank case 11 and fitted with a cylinder head 12. Mounted within the crank case 11 is a crank shaft 13 having a crank throw 14 thereon and carrying a crank pin 15. One end of a piston rod 16 is mounted upon the crank pin. The other end of the piston rod is connected by a wrist pin 17 to a piston 18. In the present instance only one cylinder is illustrated, it will be understood, however, that any number of cylinders may be used as desired.

A cylinder head is here shown as being formed with an inlet passageway 18 terminating in a valve seat here shown as disposed centrally of the end wall of the cylinder head and receiving a tappet valve 20. The tappet valve 20 is mounted to fit against the under tapered face of the valve seat 19 and will be held against this seat when an explosion takes place within the cylinder. The tappet valve 20 is secured to a valve stem 21 which reciprocates through a bearing 22 in the cylinder head and is provided with a rocker arm 23 which is mounted upon a shaft 24. A spring 25 acts to hold the valve in its seated position. A tappet rod 26 acts against the rocker arm. This rod may be operated mechanically in the usual manner.

Formed in the side wall of the cylinder 10 is an exhaust port 31 having a seat 32 at the outer end thereof. A tappet valve 33 is mounted over this seat and is yieldably held by a spring 34 interposed between the tappet valve element 33 and a bearing 35. The bearing 35 provides a support for the reciprocation of the valve stem 36. An adjusting screw 37 is mounted upon the stem 36 so that the effective tension of the spring 34 may be accurately adjusted. This adjustment plays an important part in the proper functioning of the engine. Attention is directed to the fact that the exhaust valve 33 is not mechanically operated and that it opens and closes due to various pressure conditions which exist within the cylinder 10 at different points in the cycle of movement of the piston. For a purpose to be hereinafter more fully described the inner circumferential wall of the cylinder head 12 is formed with a plurality of circumferentially extending corrugations 38.

The method of the present invention is carried out in the following manner:

A liquid fuel or gas is introduced into a carburetor which carburetor is of any suitable type. It is intended that the engine shall operate normally on a "full open" carburetor and that the throttle will act to close the carburetor in retarding action of the engine and in thus depleting the amount of gaseous fuel which is being delivered to the engine cylinder. When the engine is first turned over in a starting operation ignition may take place through a spark plug 40, after which the engine will proceed to operate without resorting to spark plug ignition. This will be more fully set out as the description of operation proceeds and is a salient feature of the present invention..

By reference to Figures 2 and 9 of the drawings, it will be seen that the piston is in a condition for an initial operation, at which time it will be noted that there has been entrapped in the compression space of the cylinder head 12 a quantity of explosive gas indicated at 41 and a quantity of burned gas, indicated at 42. Due to the character and density these two gases tend to lie in separate strata. When ignition takes place as by means of the spark plug 40, the explosive gas 41 will be ignited. At this time the inlet valve 20 is closed as well as the exhaust valve 33. The result will be that the explosive charge 41 will be ignited and as it expands and exerts its explosive force it will force downwardly upon the piston 18 and impart a rotating motion to the crank-shaft 13 through the crank pin 15 and in a direction of the arrow a. The piston will then move down to a position where it will uncover the exhaust port 31. The position of this exhaust port in the length of the cylinder 10 has been accurately proportioned so that the explosive gas will be spent to a large extent although still under positive pressure. As the piston 18 uncovers the exhaust port 31 the pressure of the gas above the piston will act to overcome the action of the exhaust valve spring 34. This will cause the exhaust valve 33 to be lifted from its seat 32 against the action of the spring 34 in which position the exhaust valve will be maintained until the force of the spring 34 is greater than the force exerted by the gas within the cylinder 10. This position of equilibrium between the gas pressure and the spring pressure is accurately determined and regulated by the adjusting element 37 which acts against the spring. As the valve 33 closes the piston 18 continues to move downwardly in the cylinder 10.

Attention is called to the fact that a peculiar physical phenomenon takes places during the first exhaust period, as designated in Figure 2 of the drawings. At this time the residual gas under pressure is released from its confined space, and due to this release the temperature of the residual gas will be instantly reduced since the pressure has fallen to an amount slightly above atmospheric pressure, as determined by the action of the spring 34. When this temperature drop occurs an additional pressure drop is produced. This pressure drop phenomenon has been here termed as the reaction of the residual gases. Prior to the instant at which the piston uncovers the exhaust port 31 the temperature of the gas will be at its highest, and according to well-known laws will also be at its highest pressure. At the instant the port 31 is uncovered the exhaust valve will open. This will allow the confined pressure of the gas within the cylinder 10 to violently drop to atmospheric pressure as the pressures equalize within and without the cylinder. The outward surge of the gas will, by its velocity and furthermore due to the pressure drop incident to the lowering of temperature, cause the pressure within the cylinder to become sub-atmospheric. At this time the intake valve and the exhaust valve are both closed.

In the interval after the exhaust valve 33 has become closed the piston 18 continues to move downwardly. This period of downward movement is accompanied by the opening of the intake valve 20. The intake valve, as has been previously described, is effected by direct rotation of the crank-shaft 13 through conventional timing means. It will be recognized that at the instant of opening of the intake valve a condition of sub-atmospheric pressure exists within the cylinder. This tends to draw in the fresh charge of gas above the burned gas entrapped when the exhaust valve closed. The incoming fuel gas is relatively cool and also facilitates intake in addition to the suction action of the piston.

It is to be recognized that while but one cylinder and piston unit is here disclosed, and thus one cam and valve operating mechanism, that an increased number of cylinder units might be provided, in which instance a corresponding increase in valve plungers 28 and cylinders 27 may be necessary. In that event the plungers 28 with their members 29 may be arranged along the axis of the cam 30 so that the one cam may be used to consecutively operate the series of plungers and thereby consecutively impart a motion to the plungers which will act upon the incompressible fluid within the cylinders 27 and produce a moving force for the various valve mechanisms.

At the time the inlet valve 20 is opened there will be a negative pressure within the cylinder 10. This is due to the fact that equilibrium was almost established between the pressure within the cylinder and atmospheric pressure at the time the spring 34 closed the valve 33. The pressure within the cylinder will be further lowered until it becomes a negative pressure as the piston moves to the lower end of its stroke. Such a negative pressure exists at the moment the inlet valve 20 is opened and when the parts are in the position substantially disclosed in Figure 3 of the drawings. This condition acts to cool the engine parts and has insured that the engine used in actual practice has been sufficiently cool to permit an observer to touch the cylinder head with his hand.

When the inlet valve 20 is opened and the area within the cylinder under negative pressure is placed in communication with the inlet passage 18, which passage is under a condition of atmospheric pressure, it will be evident that the fresh gas will be quickly drawn into the cylinder due to the suction action produced by the further downward movement of the piston 18 from the position shown in Figure 3 to the end of its stroke as shown in Figure 4.

A row of circumferentially extending corrugations 38 are formed around the wall of the cylinder head 12. These corrugations circumscribe the area within which the inlet valve 20 operates. This inlet valve has a downwardly and outwardly tapered body portion and a disc-shaped lower portion 43, which is of larger diameter than the mouth of the valve seat opening 19. The result will be that the incoming gas will be deflected by the disc portion 43 in a radial direction and that it will move toward the corrugations 38, where its tendency to eddy and flow lengthwise of the cylinder will be materially retarded. This is a matter of prime importance in the present case since it is fundamentally necessary for the fresh gas and the residual gas to become arranged in separate well defined strata before an explosive action takes place. It will thus be recognized that the two strata of gases arrange themselves so that the relatively hot residual gas will be disposed between the head of the piston and the strata of unspent fresh gas, and it should be understood that the time interval between the introduction of these gases and their compression and firing is such as to insure that the two gases will not have sufficient time to mix and lose their stratified arrangement. It will be evident that due to the transfer of latent heat from the residual gases to the fresh gases the ignition action may be completed under relatively low compression, as compared with that required in an engine of the Diesel type.

Attention is also called to the fact that the velocity of the out-flowing residual gases does not have the effect usually obtained in a 2-cycle engine in drawing in a fresh charge of explosive gas due to the fact that at the interval of exhaust the intake valve 20 is closed. The intake of fresh gas is caused by a condition of sub-atmospheric pressure created by reaction within the cylinder by the release of spent gases therefrom, the reaction following release and actual displacement created by the downward movement of the piston. Attention is directed to the fact that all of this action takes place during a continuous single down-stroke of the piston, and that while the exhaust and charging action in the usual 2-cycle engine and the engine of the present invention takes place on the same down-stroke the fundamental actions and phenomena are entirely different.

In Figure 4, of the drawings, it will be seen that at the bottom of the down-stroke of the piston 18 the inlet valve 20 is still open, thus insuring the maximum inlet quantity of fresh gas at the end of the down-stroke of the piston. The exact character and richness of this gas has been determined by the throttle regulation. It will also be recognized that at this particular time the fresh and spent gases will be under a condition of equilibrium with relation to each other and also under a condition of equilibrium with relation to atmospheric pressure since the exhaust valve could open if a pressure greater than atmospheric pressure plus the spring pressure occurred.

By reference to Figure 4 of the drawings, attention is directed to the fact that the relative quantitative proportions of the two strata of gases is such as to insure that the lower boundary of the stratum of fresh gas does not extend down to the port 31 so that during a subsequent operation to be described the piston will not displace and waste the fresh gas. As the piston 18 starts upwardly on its compression stroke the intake valve 20 is immediately closed. This causes the entrapped gases to be compressed. The compression will progressively increase as the piston moves until this positive pressure overcomes atmospheric pressure plus the force of the exhaust spring 34, at which time the exhaust valve 33 will be forced from its seat and gas from the cylinder 10 will be forced outwardly therefrom. Attention is directed to the fact, however, that since the exhaust port is at all times in the environment of the spent gases, the gases which are forced from the cylinder 10 by displacement created by the piston 18 will only be residual gases which it is desirable to exhaust. Attention is directed to the fact also that at this time the stratum of fresh gas will act as a column to resist upward movement of the residual gas so that the residual gas will be displaced as the piston tends to compress the fresh gas thereabove. Due to this action it will be seen that a portion of the residual gas is exhausted from the cylinder on the down-stroke, as indicated at Figure 2 of the drawings, and that an additional portion of residual gas is exhausted on the up-stroke of the piston, as indicated in Figure 6 of the drawings. On that portion of the up-stroke of the piston continuing until its upper end covers the port 31 the gases will be under a pressure slightly in excess of atmospheric pressure as represented by a tension of the spring 34. It will be recognized, however, from Figure 7 of the drawings, that all of the residual gas is not exhausted from the cylinder. In other words, a complete scavenging action within the cylinder never takes place. This results in producing the novel ignition phenomenon, which is to be hereinafter explained.

In Figure 7 of the drawings, it will be noted that the piston 18 has moved upwardly across the exhaust port 31 and positively closes the same. The intake valve 20 has already been closed so that the actual compression stroke then begins. During this compression stroke a stratum of residual gas and a stratum of fresh gas is compressed within the cylinder and at which time heat will develop since the particles will be in motion due to compression. At the same time, however, the latent heat in the residual gas will impart its heat to that of the fresh charge of gas, thereby aiding in raising the temperature of the gas without requiring high compression. It has been found, however, in extensive experimentation that while these particles of gas are in motion ignition does not take place but that at the moment the crankshaft passes over dead-center the gases compressed within the cylinder head will ignite, producing a new power stroke. This is accomplished without the resort to any ignition agency. In this particular, the invention appears to follow the principle utilized in the Diesel type of engine, but as here shown conduction of heat from the entrapped residual gases and the compression of the entrapped residual gases and the new gaseous charge perform this function in an entirely novel manner. Due to this type of combustion localized ignition of the explosive charge does not take place but the entire charge is ignited at one, thus producing a maximum amount of power delivered in a substantially instantaneous explosive impulse. It is also to be pointed out that while a Diesel type engine uses liquid fuel injected into the compression cylinder this particular engine utilizes carbureted fuel drawn in as heretofore described. This ignition must take place under conditions in which the volumetric proportions of the residual and fresh gases are accurately controlled, as well as their temperatures, the result being that a substantially perfect and uniform combustion takes place within the cylinder which insures the elimination of carbon-monoxide since the fuel is burned until the carbon is in the form of a harmless carbon-dioxide. It is also to be pointed out that due to the present arrangement a stratum of residual gas is at all times interposed between the fresh explosive charge and the head of the piston, the result being that the intermediate stratum of residual gas thus prevents condensation with a resulting entrainment of liquid fuel into the crank case where it would contaminate the crank case oil and would, of course, produce a waste of fuel and oil.

It will thus be seen that the invention as here disclosed provides a novel method and means of preparing and handling a gaseous fuel within an internal combustion engine whereby an engine of relatively light weight may be utilized to produce a maximum amount of power with a minimum consumption of fuel and whereby a highly efficient internal combustion engine performance is obtained. It will thus be seen that the method and means of creating power by an explosive charge within an internal combustion engine, as here shown, is such that various changes might be made in the steps of the method and the combination and arrangement of the parts of the apparatus by those skilled in the art without departing from the spirit of the invention as claimed.

Having thus described my invention, what I claim and desire to secure by Letters Patent is:

1. A method of producing an explosive charge within an internal combustion engine of the type including a cylinder, a piston reciprocating therein, a positively operated intake valve through which gaseous fuel is delivered to the engine cylinder and an exhaust check valve through which residual gases may be exhausted from the cylinder but cannot return, which method consists in exploding a charge of gaseous fuel in the cylinder while the intake valve is closed and the exhaust valve is covered by the piston whereby the piston will be moved downwardly in the cylinder, then uncovering the exhaust valve permitting a portion of the residual gases to exhaust from the cylinder, thereafter positively opening the intake valve drawing fresh gas into the cylinder in a stratum above that of the residual gases as the piston continues on its lower stroke, then closing the cylinder by positively closing the intake valve and covering the exhaust valve port to prevent the outflow of gases therefrom and to permit compression of the gas strata therein and whereby the gas strata will be ignited due to the latent heat of the residual gas and the degree of compression of the fresh gas.

2. A method of producing an explosion within the cylinder of an internal combustion engine and against a piston reciprocating therein which consists in establishing a stratum of fresh gaseous fuel in the top of the cylinder and a stratum of burned gaseous fuel therebeneath, thereafter compressing the strata of gases within the cylinder head whereby the heat from the burned gases will be imparted to the fresh gas and then interrupting the compression action whereby an explosion of the fresh gases will take place, thereafter increasing the compression space within the engine cylinder and permitting a portion of the gas in the spent gas stratum to exhaust from the cylinder, subsequently permitting a free inflow of fresh gas into the cylinder head and then compressing said strata of gases, during a portion of which compression action an additional amount of spent gas is exhausted from the compression space.

3. A method of producing an explosion of a gaseous charge within an internal combustion engine which engine includes a cylinder having a positively operated valve controlled intake port in its head, a check valve controlled exhaust port in its side wall at a point intermediate the length thereof and within which cylinder a piston reciprocates in synchronism with the movement of the positively operated intake valve and to a point above and below the exhaust port, which method consists in exploding a charge of gaseous fuel in the cylinder when the intake valve is closed and the piston is at the end of its compression stroke and has closed the exhaust port, after which the piston is moved downwardly on its power stroke until the exhaust port is uncovered thereby and then continues to move downwardly while the intake valve is open, whereby a stratum of fresh gas will accumulate within the cylinder head above an undisturbed stratum of burned gas between said fresh gas stratum and the piston head, thereafter simultaneously closing the intake valve and moving the piston in a compression stroke whereby the fresh gas stratum will be compressed and the spent gas stratum will be compressed and a portion of the spent gas will be forced through the exhaust port and around the check valve until the piston has closed the exhaust port, after which the gas strata are further compressed until the piston has reached the end of its compression stroke and the two gases are relatively motionless and in heat exchange relationship with each other whereby ignition of the fresh gas will take place to produce a power stroke of the piston.

4. A method of producing an explosion of a gaseous charge within an internal combustion engine which engine includes a cylinder having a positively operated valve controlled intake port in its head, a check valve controlled exhaust port in its side wall at a point intermediate the length thereof and within which cylinder a piston reciprocates in synchronism with the movement of the positively operated intake valve and to a point above and below the exhaust port, which method consists in exploding a charge of gaseous fuel in the cylinder when the intake valve is closed and the piston is at the end of its compression stroke and has closed the exhaust port, after which the piston is moved downwardly on its power stroke until the exhaust port is uncovered thereby and then continues to move downwardly while the intake valve is open, after which time the spent gas will partially exhaust through the check valve creating a negative pressure, whereby a stratum of fresh gas will accumulate within the cylinder head above an undisturbed stratum of burned gas between said fresh gas stratum and the piston head, thereafter simultaneously closing the intake valve and moving the piston in a compression stroke whereby the fresh gas stratum will be compressed and the spent gas stratum will be compressed and a portion of the spent gas will be forced through the exhaust port and around the check valve until the piston has closed the exhaust port, after which the gas strata are further compressed until the piston has reached the end of its compression stroke and the two gases are relatively motionless and in heat exchange relationship with each other whereby ignition of the fresh gas will take place to produce a power stroke of the piston.

5. An internal combustion engine comprising a cylinder, a piston reciprocating therein, an inlet port at the cylinder head, an exhaust port in the cylinder wall and at a point intermediate the length of the cylinder, a positively operated inlet valve for closing and opening the inlet port, a crank-shaft to which the piston is connected, a timing means connected with the crank-shaft and actuating the inlet valve in synchronism therewith whereby the inlet port will be open during a portion of the down-stroke of the piston and closed on the up-stroke and a check valve normally closing the exhaust port and being held with a yieldable pressure to resist opening until a predetermined pressure has been exerted against it by the gases within the cylinder, said exhaust port being so positioned as to be covered and closed by the piston throughout a portion of the power and compression strokes of the piston and to occur below the area occupied by the stratum of fresh gas which is drawn into the piston head, whereby on the down-stroke and on the up-stroke of the piston a proportion of the exhaust gas may pass through the exhaust port without disturbing the stratum of fresh gas accumulating within the cylinder.

6. An internal combustion engine comprising a cylinder, a piston reciprocating therein, an inlet port at the cylinder head, an exhaust port in the cylinder wall and at a point intermediate the length of the cylinder, a positively operated inlet valve for closing and opening the inlet port, a crank-shaft to which the piston is connected, a timing means connected with the crank-shaft and actuating the inlet valve in synchronism therewith whereby the inlet port will be open during a portion of the down-stroke of the piston and closed on the up-stroke, a check valve normally closing the exhaust port and being held with a yieldable pressure to reseat in the opening until a predetermined pressure has been exerted against it by the gases within the cylinder, said exhaust port being so positioned as to be covered and closed by the piston throughout a portion of the power and compression strokes of the piston and to occur below the area occupied by the stratum of fresh gas which is drawn into the piston head, whereby on the down-stroke and on the up-stroke of the piston a proportion of the exhaust gas may pass through the exhaust port without disturbing the stratum of fresh gas accumulating within the cylinder and means for adjusting the exhaust port valve to cause it to respond to a predetermined pressure within the cylinder when the port is uncovered by the piston.

7. An internal combustion engine comprising a cylinder, a piston reciprocating therein, an inlet port at the cylinder head, an exhaust port in the cylinder wall and at a point intermediate the length of the cylinder, a positively operated inlet valve for closing and opening the inlet port, a crank-shaft to which the piston is connected, a timing means connected with the crank-shaft and actuating the inlet valve in synchronism therewith whereby the inlet port will be open during a portion of the down-stroke of the piston and closed on the up-stroke, a check valve normally closing the exhaust port and being held with a yieldable pressure to resist opening until a predetermined pressure has been exerted against it by the gases within the cylinder, said exhaust port being so positioned as to be covered and closed by the piston throughout a portion of the power and compression strokes of the piston and to occur below the area occupied by the stratum of fresh gas which is drawn into the piston head, whereby on the down-stroke and on the up-stroke of the piston a proportion of the exhaust gas may pass through the exhaust port without disturbing the stratum of fresh gas accumulating within the cylinder and means for adjusting the exhaust port valve to cause it to respond to a predetermined pressure within the cylinder when the port is uncovered by the piston and cooperating means between the inlet valve and the cylinder wall whereby the incoming gaseous fuel will arrange itself in a definite stratum in the uppermost part of the cylinder.

8. A method of exhausting, scavenging, and charging an internal combustion engine, which engine includes a cylinder having a positively operated fuel intake valve in its head, a piston reciprocating within the cylinder, an exhaust port substantially midway the length of the cylinder wall and therethrough and over which the piston moves, and an exhaust check valve in the exhaust port through which gas may exit from the cylinder only, which method consists in accumulating an explosive charge within the cylinder and compressing the same while the intake valve is closed, whereby the piston will move downwardly and uncover the exhaust port as it continues on its downward path while the gases from the cylinder pass outwardly through said port and the check valve until they have reached a sub-atmospheric pressure when the check valve is closed, thereafter positively opening the intake valve as the piston continues on its down stroke, whereby gaseous fuel will be drawn into the cylinder to fill the sub-atmospheric space therein, then reversing the stroke of the piston while simultaneously closing the intake valve whereby gases in the cylinder and adjacent the piston head will be forced out through the exhaust port until the piston is closed thereby, and then continuing the compression stroke while the intake valve and the exhaust port are both closed preparatory to another firing of the cylinder.

HENRY M. KINSLOW.